(12) United States Patent
Chen et al.

(10) Patent No.: US 12,442,497 B2
(45) Date of Patent: Oct. 14, 2025

(54) LIGHTING APPARATUS

(71) Applicant: LEEDARSON LIGHTING CO., LTD., Fujian (CN)

(72) Inventors: Huiwu Chen, Fujian (CN); Zongyuan Liu, Fujian (CN); Xiaobo Chen, Fujian (CN); Yongshu Zheng, Fujian (CN); Cheng Luo, Fujian (CN)

(73) Assignee: LEEDARSON LIGHTING CO., LTD., Fujian (CN)

( * ) Notice: Subject to any disclaimer, the term of this patent is extended or adjusted under 35 U.S.C. 154(b) by 0 days.

(21) Appl. No.: 19/069,284

(22) Filed: Mar. 4, 2025

(65) Prior Publication Data

US 2025/0277568 A1    Sep. 4, 2025

(30) Foreign Application Priority Data

Mar. 4, 2024  (CN) .......................... 202420411841.0

(51) Int. Cl.
| | |
|---|---|
| *F21S 4/24* | (2016.01) |
| *F21K 9/232* | (2016.01) |
| *F21K 9/64* | (2016.01) |
| *F21K 9/69* | (2016.01) |
| *F21V 23/06* | (2006.01) |
| *F21V 29/71* | (2015.01) |
| *F21Y 105/12* | (2016.01) |
| *F21Y 107/70* | (2016.01) |
| *F21Y 109/00* | (2016.01) |
| *F21Y 115/10* | (2016.01) |

(52) U.S. Cl.
CPC ................ *F21S 4/24* (2016.01); *F21K 9/232* (2016.08); *F21K 9/64* (2016.08); *F21K 9/69* (2016.08); *F21V 23/06* (2013.01); *F21V 29/713* (2015.01); *F21Y 2105/12* (2016.08); *F21Y 2107/70* (2016.08); *F21Y 2109/00* (2016.08); *F21Y 2115/10* (2016.08)

(58) Field of Classification Search
CPC .......... F21S 4/24; F21V 29/713; F21V 23/06; F21K 9/64; F21K 9/232; F21K 9/69
See application file for complete search history.

(56) References Cited

U.S. PATENT DOCUMENTS

| | | | |
|---|---|---|---|
| 11,187,387 B1 * | 11/2021 | Yan .......................... | F21K 9/232 |
| 11,603,968 B1 * | 3/2023 | Machlis .................... | F21S 4/24 |
| 12,359,779 B1 * | 7/2025 | Jiang ........................ | F21K 9/232 |
| 2022/0390074 A1 * | 12/2022 | Van Der Lubbe ...... | F21K 9/232 |
| 2025/0089134 A1 * | 3/2025 | Lin ......................... | H05B 45/10 |
| 2025/0172255 A1 * | 5/2025 | Chen ........................ | F21K 9/64 |

* cited by examiner

*Primary Examiner* — Christopher E Dunay
(74) *Attorney, Agent, or Firm* — LANWAY IPR SERVICES; Chun-Ming Shih

(57) ABSTRACT

A lighting device includes a flexible substrate, four types of LED modules, and a driver. The substrate has an elongated area divided into four bands along the Y-axis. First-type LEDs are placed on the first band in a row along the X-axis, parallel to the substrate's length. Second-, third-, and fourth-type LEDs are placed on the second, third, and fourth bands, respectively. Each type emits light with different optical properties. The Y-axis is perpendicular to the X-axis, with first-type LEDs aligned with fourth-type LEDs and second-type LEDs aligned with third-type LEDs. First-type LEDs are offset from second-type LEDs along the X-axis. The driver converts external power into four currents, adjusting their relative ratios to control the combined optical output.

20 Claims, 8 Drawing Sheets

LIGHTING APPARATUS

FIELD

The present invention is related to a lighting apparatus, and more particularly related to a lighting apparatus with better light pattern.

BACKGROUND

Over the past few decades, LED technology has advanced rapidly, offering a more energy-efficient and long-lasting alternative to traditional lighting. With continuous improvements in semiconductor materials and light conversion efficiency, LEDs have significantly reduced energy consumption while maintaining high brightness and durability. As a result, LED lighting has become a dominant force in the lighting industry, gradually replacing conventional light sources.

Traditional light bulbs, such as incandescent and fluorescent lamps, have been widely used for over a century. However, these light sources suffer from inefficiencies, short lifespans, and high energy consumption. Governments and industries worldwide have promoted the transition to LED lighting as a sustainable solution, aiming to reduce electricity usage and environmental impact. The shift towards LED technology is not only a response to energy concerns but also an opportunity to enhance lighting performance and design flexibility.

Among various LED applications, LED light bulbs have been developed to replace traditional filament-based bulbs. While they provide the benefits of higher efficiency and longer lifespan, some consumers still prefer the classic aesthetic of traditional light bulbs. The warm glow and familiar design of incandescent bulbs hold sentimental and decorative value, leading to a demand for LED alternatives that retain the nostalgic appeal of older lighting technologies.

To address this, flexible LED light strips have emerged as an innovative solution. By arranging LEDs on a bendable substrate, these strips can be shaped to mimic the look of filament-based bulbs, preserving the vintage aesthetic while offering superior energy efficiency and design flexibility. This approach allows LED light bulbs to maintain a classic appearance while integrating the advanced performance characteristics of modern LEDs.

Beyond aesthetics, flexible LED strips provide additional advantages over traditional light sources. Unlike rigid filaments, LED strips can be designed with customized light patterns, dynamic lighting effects, and precise control over brightness and color temperature. This versatility enables designers to create more sophisticated and adaptive lighting solutions, enhancing both functionality and visual appeal.

While flexible LED strips offer significant advantages, optimizing their cost is essential for widespread adoption. Manufacturing processes, material selection, and power efficiency must be carefully balanced to produce high-quality yet affordable lighting solutions. Reducing production costs while maintaining performance will determine the success of flexible LED technology in replacing traditional bulbs on a large scale.

In addition to cost considerations, light distribution patterns must be carefully engineered. Unlike point-source light from incandescent filaments, LED strips emit light along a surface, requiring innovative optical designs to achieve uniform illumination. Diffusers, reflectors, and lens coatings are essential components in shaping the emitted light to meet the expectations of consumers accustomed to traditional bulbs.

Durability and environmental factors also play a role in designing advanced LED lighting. Heat dissipation mechanisms, flexible yet sturdy materials, and resistance to moisture and dust must be considered to ensure reliability. The ability to withstand bending and twisting without compromising performance is crucial for maintaining the longevity of flexible LED light strips.

To further improve these lighting solutions, additional functionalities can be integrated. Smart lighting controls, dimmable features, and adaptive color tuning can enhance user experience, making LED bulbs not just a replacement but an upgrade over traditional lighting. The ability to adjust brightness and color temperature dynamically allows users to personalize their lighting environments for different moods and tasks.

As LED technology continues to evolve, the challenge lies in combining cost-efficiency, aesthetic appeal, and advanced functionality into a single innovative lighting device. By refining flexible LED strip designs and optimizing their integration into light bulbs, the industry can create next-generation lighting solutions that offer both the charm of traditional bulbs and the superior performance of modern LEDs.

SUMMARY

In some embodiments, a lighting apparatus includes a flexible substrate, a plurality of first-type LED modules, a plurality of second-type LED modules, a plurality of third-type LED modules, a plurality of fourth-type LED modules and a driver.

The flexible substrate has an elongated area.

The elongated area is divided into a first band, a second band, a third band, and a fourth band along a Y-axis direction.

The plurality of first-type LED modules are disposed on the first band.

The first-type LED modules are aligned in a row along an X-axis direction, the X-axis direction being parallel to a longitudinal edge of the elongated area.

The plurality of second-type LED modules are disposed on the second band.

The plurality of third-type LED modules are disposed on the third band.

The plurality of fourth-type LED modules are disposed on the fourth band.

The first-type LED modules, the second-type LED modules, the third-type LED modules, and the fourth-type LED modules emit light have different optical parameters.

The Y-axis direction is perpendicular to the X-axis direction.

The first-type LED modules are substantially aligned with the fourth-type LED modules along the Y-axis.

The second-type LED modules are aligned with the third-type LED modules along the Y-axis.

The first-type LED modules are offset from the second-type LED modules in the X-axis direction by a predetermined distance.

The driver is configured to convert an external power source to generate four driving currents respectively supplied to the first-type LED modules, the second-type LED modules, the third-type LED modules, and the fourth-type LED modules.

The driver is further configured to adjust a relative ratio of the four driving currents to control a mixed optical parameter of the emitted light.

In some embodiments, the first-type LED modules are blue light sources, the second-type LED modules are green light sources, the third-type LED modules are red light sources, and the fourth-type LED modules are yellow-green light sources.

In some embodiments, the red light sources, the green light sources, the blue light sources, and the yellow-green light sources are arranged on the flexible substrate in a horizontally staggered configuration.

In some embodiments, the red light sources, the green light sources, the blue light sources, and the yellow-green light sources are independent from one another.

In some embodiments, the red light sources comprise blue LED chips coated with red phosphor, the green light sources comprise green LED chips, the blue light sources comprise blue LED chips, and the yellow-green light sources comprise blue LED chips coated with yellow-green phosphor.

In some embodiments, the red phosphor and the yellow-green phosphor are applied to the surface of the LED chips by spraying or dispensing.

In some embodiments, the lighting apparatus may also include a diffusion layer covering the flexible substrate.

The diffusion layer is a transparent adhesive mixed with diffusion powder.

In some embodiments, the flexible substrate is a light-transmissive substrate.

In some embodiments, terminals pins are provided at both ends of the flexible substrate.

In some embodiments, each band has two terminals located on opposite sides of the band.

In some embodiments, the flexible substrate is curled and arranged in a helical shape within a lampshade.

In some embodiments, the first-type LED modules and the fourth-type LED modules are disposed on a first side of the flexible substrate, and the second-type LED modules and the third-type LED modules are disposed on a second side of the flexible substrate.

The first side and the second side are opposite sides of the flexible substrate.

In some embodiments, the first-type LED modules are disposed on a first side of the flexible substrate, and a lens is positioned on a second side of the flexible substrate at a location corresponding to each first-type LED module.

The first side and the second side are opposite sides of the flexible substrate.

In some embodiments, the first-type LED modules are disposed on a first side of the flexible substrate, and a heat sink module is positioned on a second side of the flexible substrate at a location corresponding to each first-type LED module.

The first side and the second side are opposite sides of the flexible substrate.

In some embodiments, the heat sink modules are connected together to guide heat away from the first-type LED modules.

In some embodiments, multiple heat sink modules transmit heat to a heat sink block.

In some embodiments, the heat sink module is transparent.

In some embodiments, the first-type LED modules, the second-type LED modules, the third-type LED modules, and the fourth-type LED modules are respectively connected in series.

In some embodiments, multiple uneven surfaces are formed on the flexible substrate to enhance light mixing.

In some embodiments, the lighting apparatus may also include a torsion sensor configured to detect the twisting state of the flexible substrate.

The driver adjusts the driving currents based on the detected twisting state.

DETAILED DESCRIPTION

Figure 3:
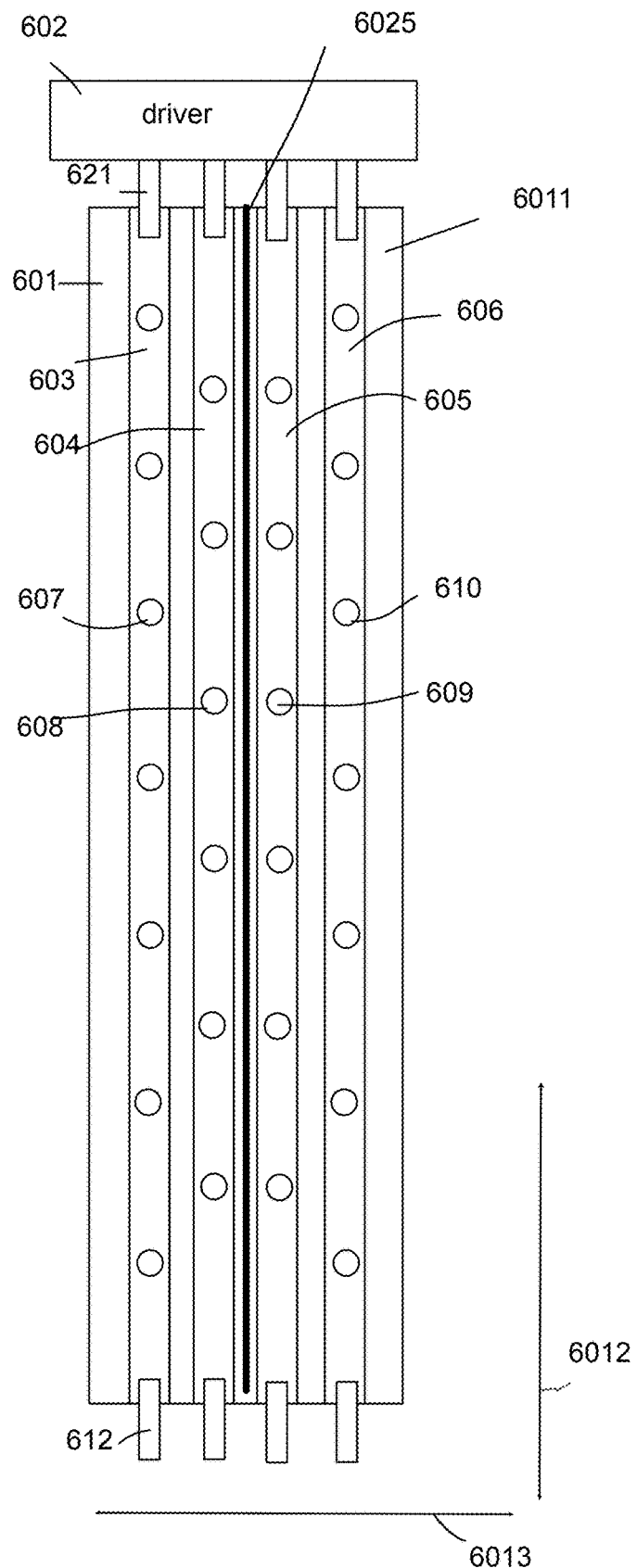
FIG. 3 shows a light strip embodiment based on one preferred embodiment.

In FIG. 3, a lighting apparatus includes a flexible substrate 601, a plurality of first-type LED modules 607, a plurality of second-type LED modules 608, a plurality of third-type LED modules 609, a plurality of fourth-type LED modules 610 and a driver 602.

The flexible substrate 601 has an elongated area 6011.

The elongated area 6011 is divided into a first band 603, a second band 604, a third band 605, and a fourth band 606 along a Y-axis direction 6013.

The plurality of first-type LED modules 607 are disposed on the first band 603. The bands 603, 604, 605, 606 are a strip sub-areas of the elongated area 602. They can be just areas on the flexible substrate 601 or four separate units attached to the flexible substrate. For example, 20 first-type LED modules are attached to the first band 603 and then attach the first band 603 to the flexible substrate 601.

The first-type LED modules are aligned in a row along an X-axis direction 6012, the X-axis direction 6012, as illustrated in FIG. 3, being parallel to a longitudinal edge of the elongated area 6011.

The plurality of second-type LED modules 608 are disposed on the second band 604.

The plurality of third-type LED modules 609 are disposed on the third band 605.

The plurality of fourth-type LED modules 610 are disposed on the fourth band 606.

The first-type LED modules, the second-type LED modules, the third-type LED modules, and the fourth-type LED modules emit light have different optical parameters. For example, they emit lights of different color temperatures, and/or emit lights with different colors.

The Y-axis direction 6013 is perpendicular to the X-axis direction 6012.

The first-type LED modules 607 are substantially aligned with the fourth-type LED modules 610 along the Y-axis direction 6013, as illustrated in FIG. 3.

The second-type LED modules 608 are aligned with the third-type LED modules 609 along the Y-axis direction 6013, as illustrated in FIG. 3.

The first-type LED modules 607 are offset from the second-type LED modules 608 in the X-axis direction 6012 by a predetermined distance.

In some embodiments, the four types of LED modules are arranged evenly with substantially same distance with each other.

The driver 602 is configured to convert an external power source, e.g. an AC power 110V from normal power supply, to generate four driving currents respectively supplied to the first-type LED modules 607, the second-type LED modules 608, the third-type LED modules 609, and the fourth-type LED modules 610.

The driver 602 is further configured to adjust a relative ratio of the four driving currents to control a mixed optical parameter of the emitted light.

In some embodiments, the first-type LED modules are blue light sources, the second-type LED modules are green light sources, the third-type LED modules are red light sources, and the fourth-type LED modules are yellow-green light sources.

In some embodiments, the red light sources, the green light sources, the blue light sources, and the yellow-green light sources are arranged on the flexible substrate in a horizontally staggered configuration.

In some embodiments, the red light sources, the green light sources, the blue light sources, and the yellow-green light sources are independent from one another.

In some embodiments, the red light sources comprise blue LED chips coated with red phosphor, the green light sources comprise green LED chips, the blue light sources comprise blue LED chips, and the yellow-green light sources comprise blue LED chips coated with yellow-green phosphor.

In some embodiments, the red phosphor and the yellow-green phosphor are applied to the surface of the LED chips by spraying or dispensing.

Figure 6:
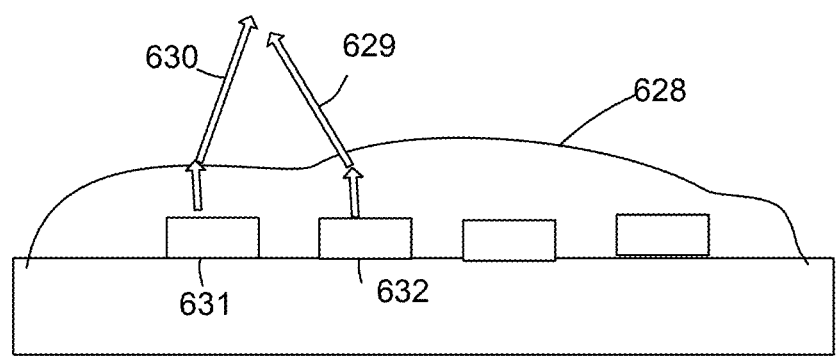
FIG. 6 shows an arrangement of a covered layer.

In some embodiments, the lighting apparatus may also include a diffusion layer covering the flexible substrate. FIG. 6 shows an example of such diffusion layer 628, which can be made non-evenly, not flat surface, to further randomize the light output to achieve better light mixing effect.

The diffusion layer is a transparent adhesive mixed with diffusion powder. The diffusion powder may add more to increase diffusion effect under different requirements.

In some embodiments, the flexible substrate is a light-transmissive substrate.

In FIG. 3, terminals pins 621, 612 are provided at both ends of the flexible substrate 601.

In some embodiments, each band has two terminals located on opposite sides of the band.

Figure 2:
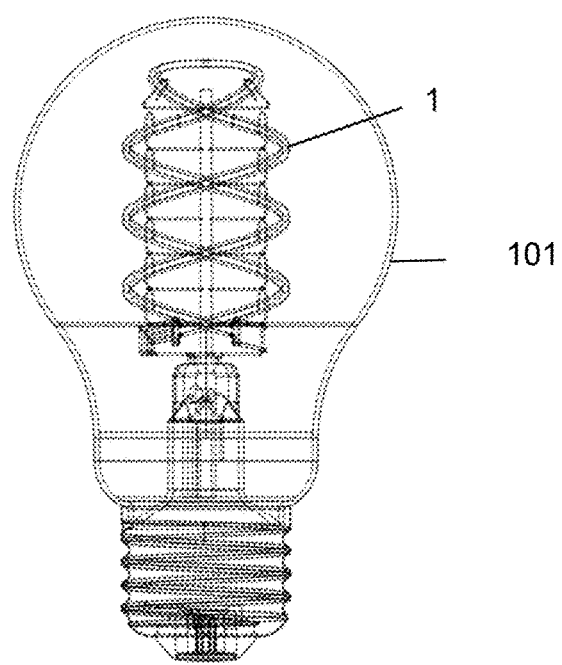
FIG. 2 is a schematic diagram of the structure of a filament lamp according to an embodiment of this application.

In FIG. 2, the flexible substrate 1 is curled and arranged in a helical shape within a lampshade 101.

Figure 7:
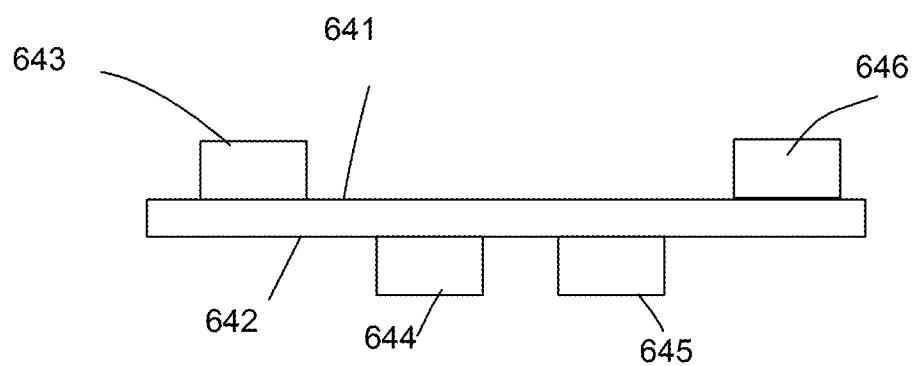
FIG. 7 shows a different arrangement of LED modules.

In FIG. 7, the first-type LED modules 643 and the fourth-type LED modules 646 are disposed on a first side 641 of the flexible substrate, and the second-type LED modules 644 and the third-type LED modules 645 re disposed on a second side 642 of the flexible substrate.

The first side 641 and the second side 642 are opposite sides of the flexible substrate.

Figure 4:
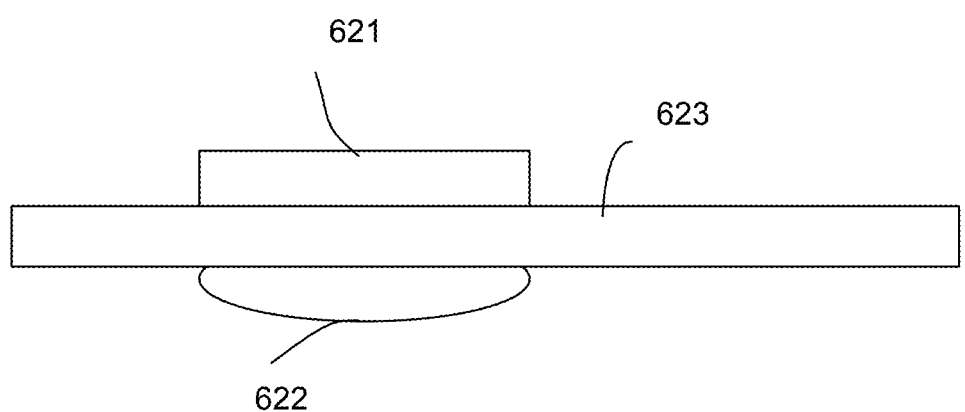
FIG. 4 shows another lighting apparatus embodiment.

In FIG. 4, the first-type LED modules 621 are disposed on a first side of the flexible substrate 623, and a lens 622 is positioned on a second side of the flexible substrate 623 at a location corresponding to each first-type LED module 621.

When the flexible substrate allows light to pass, such lens 622, not necessary to be a concave lens, may help adjust light output direction to achieve a desired light pattern and also may help to mix better for multiple light outputs.

The first side and the second side are opposite sides of the flexible substrate.

Figure 5:
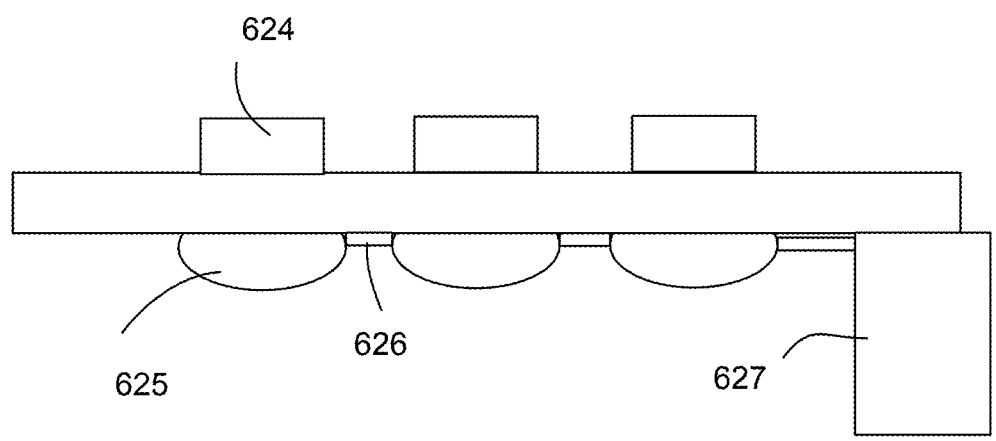
FIG. 5 shows another example with variation.

In FIG. 5, the first-type LED modules 624 are disposed on a first side of the flexible substrate, and a heat sink module 625 is positioned on a second side of the flexible substrate at a location corresponding to each first-type LED module.

The first side and the second side are opposite sides of the flexible substrate.

In FIG. 5, the heat sink modules 625 are connected together, e.g. via path 626, to guide heat away from the first-type LED modules.

In some embodiments, multiple heat sink modules transmit heat to a heat sink block 627.

In some embodiments, the heat sink module is transparent.

In some embodiments, the first-type LED modules, the second-type LED modules, the third-type LED modules, and the fourth-type LED modules are respectively connected in series.

In some embodiments, multiple uneven surfaces are formed on the flexible substrate to enhance light mixing.

FIG. 6 shows a uneven surface of the cover layer that help guide lights 630, 629 from different types of LED modules 631, 632 to better mix their lights together.

In some embodiments, the lighting apparatus may also include a torsion sensor configured to detect the twisting state of the flexible substrate.

The driver adjusts the driving currents based on the detected twisting state.

Figure 8A:
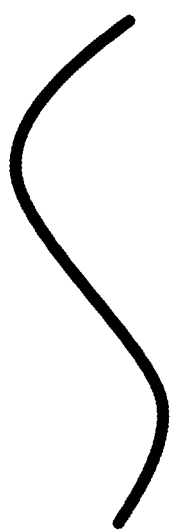
FIG. 8A and FIG. 8B show two different twisted patterns.
Figure 8B:
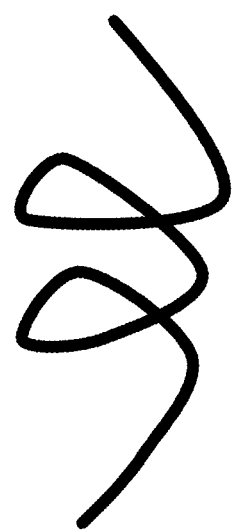

FIG. 8A and FIG. 8B show two different torsion patterns detected by the torsion sensor.

In FIG. 3, the torsion sensor 6025 provides information to the driver 602 to adjust different parameters while different twister patterns are detected.

Figure 1:
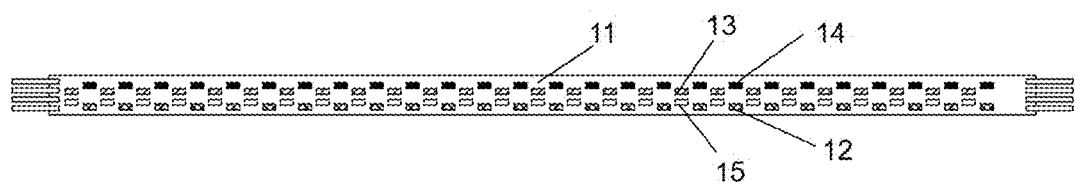
FIG. 1 is a schematic diagram of the internal structure of a high-uniformity multicolor filament according to an embodiment of this application.

FIG. 1 is a schematic diagram of the internal structure of a high-uniformity multicolor filament according to an embodiment of this application. Referring to FIG. 1, in a first aspect, this embodiment discloses a high-uniformity multicolor filament that includes a substrate and four types of light sources: red light source 12, green light source 13, blue light source 14, and yellow-green light source 15, all disposed on the substrate 11. These light sources are arranged in a staggered horizontal pattern on the substrate and are independent of one another.

This design adopts a four-channel light source scheme, with emission spectra of R (red), G (green), B (blue), and Y (yellow-green). When illuminated individually, the R, G, and B sources can mix different colors based on their duty cycles. By adjusting the ratio of R, Y, and B, the system can generate white light spectra ranging from warm white to cool white, increasing flexibility. This design also enhances the reuse of the RB spectrum while reducing filament costs and minimizing the substrate width compared to conventional five-channel RGBWW lighting solutions. Furthermore, by arranging the light sources in a staggered pattern, the design further reduces the substrate width and improves color mixing uniformity, enhancing its competitiveness in the LED filament lamp market.

In a specific embodiment, the substrate is equipped with four sets of LED chips, including one set of green LED chips and three sets of blue LED chips. One of the blue LED chips is coated with red phosphor to form the red light source 12, another is coated with yellow-green phosphor to form the yellow-green light source 15, while the remaining blue LED chip, without additional phosphor coating, serves as the blue light source 14. The green LED chip functions as the green light source 13.

By using one green LED chip and three blue LED chips, with two of the blue chips respectively coated with red and yellow-green phosphors, the system achieves four emission spectra: R (red), G (green), B (blue), and Y (yellow-green). Blue LED chips were selected because of their widespread availability, maturity, and cost-effectiveness. More importantly, blue LEDs exhibit high excitation efficiency, making them well-suited for pairing with red and yellow-green phosphors to generate the red and yellow-green spectra. The combination of R, Y, and B enables color mixing into a white light spectrum. The green LED chip enhances color purity and expands the color gamut for RGB color mixing. Additionally, the reuse of the RB spectrum benefits both white and colored light applications, improving efficiency.

In a specific embodiment, the red phosphor and yellow-green phosphor are applied to the surface of the blue LED chips using either spraying or dispensing techniques. Specifically, the dispensing method involves intermittently applying phosphor onto the surface of the blue LED chips, as opposed to the conventional continuous coating method that extends from one end to the other. This intermittent application reduces the amount of phosphor required, thereby lowering production costs.

In another embodiment, a diffusion layer is applied over the substrate. The diffusion layer consists of a transparent adhesive mixed with diffusion powder. The technique of mixing diffusion powder into transparent adhesive is well known in the field. For example, Patent No. CN204632756U discloses a diffusion layer, stating that "the diffusion layer is formed by doping diffusion powder into transparent adhesive" (Specification, Paragraph [0024]). A layer of this diffusion mixture is applied over all LED chips on the filament, resulting in a certain degree of light scattering. This ensures better uniformity when multiple LED chips emit light simultaneously, improving color mixing. Additionally, the transparent adhesive encapsulates the LED chips, forming an integrated package structure that enhances durability and provides a more aesthetically pleasing appearance.

In a specific embodiment, the substrate is made of a light-transmissive material, and the bottom of the LED chips also has a degree of light permeability. This design allows the filament to emit light in all directions, improving its luminous efficiency and visual appeal.

In another embodiment, terminals or pins are provided at both ends of the substrate, enabling electrical signal transmission and connection. This configuration facilitates power delivery and control, ensuring stable operation of the filament.

In a further embodiment, the substrate is made of a flexible material, such as a polyimide-based flexible printed circuit (FPC). This flexible structure allows the filament to be bent and installed in various lighting applications, providing greater adaptability in design.

Referring to FIG. 2, in a second aspect, this application also discloses a filament lamp that incorporates the high-uniformity multicolor filament described in the first aspect. In a specific embodiment, the filament lamp further includes a support column, a lamp base, a glass bulb, a driver, a heat-dissipating gas, and nickel rods for fixing the filament. The filament 1 is coiled at both ends to form a double-helix structure, with its ends spot-welded to the support column's pins. The support column is sintered to the bulb shell, while the driver is positioned within the lamp base, which is fixed to the lower end of the bulb using adhesive.

This filament lamp design offers an aesthetically pleasing appearance while achieving color mixing through duty cycle adjustments of the R, G, B, and Y light sources. The double-helix structure shortens the filament's preheating time, enabling faster startup. Additionally, the coiled configuration provides structural stability, reduces space usage, and enhances the uniformity of color mixing.

In a specific embodiment, the red phosphor and yellow-green phosphor are applied to the surface of the blue LED chips using either spraying or dispensing techniques. Specifically, the dispensing method involves intermittently applying phosphor onto the surface of the blue LED chips, as opposed to the conventional continuous coating method that extends from one end to the other. This intermittent application reduces the amount of phosphor required, thereby lowering production costs.

In another embodiment, a diffusion layer is applied over the substrate. The diffusion layer consists of a transparent adhesive mixed with diffusion powder. The technique of mixing diffusion powder into transparent adhesive is well known in the field. A layer of this diffusion mixture is applied over all LED chips on the filament, resulting in a certain degree of light scattering. This ensures better uniformity when multiple LED chips emit light simultaneously, improving color mixing. Additionally, the transparent adhesive encapsulates the LED chips, forming an integrated package structure that enhances durability and provides a more aesthetically pleasing appearance.

In a specific embodiment, the substrate is made of a light-transmissive material, and the bottom of the LED chips also has a degree of light permeability. This design allows the filament to emit light in all directions, improving its luminous efficiency and visual appeal.

In another embodiment, terminals or pins are provided at both ends of the substrate, enabling electrical signal transmission and connection. This configuration facilitates power delivery and control, ensuring stable operation of the filament.

In a further embodiment, the substrate is made of a flexible material, such as a polyimide-based flexible printed circuit (FPC). This flexible structure allows the filament to be bent and installed in various lighting applications, providing greater adaptability in design.

Referring to FIG. 2, in a second aspect, this application also discloses a filament lamp that incorporates the high-uniformity multicolor filament described in the first aspect. In a specific embodiment, the filament lamp further includes a support column, a lamp base, a glass bulb, a driver, a heat-dissipating gas, and nickel rods for fixing the filament. The filament 1 is coiled at both ends to form a double-helix structure, with its ends spot-welded to the support column's pins. The support column is sintered to the bulb shell, while the driver is positioned within the lamp base, which is fixed to the lower end of the bulb using adhesive.

This filament lamp design offers an aesthetically pleasing appearance while achieving color mixing through duty cycle adjustments of the R, G, B, and Y light sources. The double-helix structure shortens the filament's preheating time, enabling faster startup. Additionally, the coiled configuration provides structural stability, reduces space usage, and enhances the uniformity of color mixing.

The lighting apparatus described in the claims presents various possibilities for enhancing light emission, color mixing, and efficiency. One variation involves using a fully transparent flexible substrate. Instead of an opaque or semi-translucent substrate, a transparent material such as glass fiber-reinforced polymer or a clear polyimide film can be used. This allows light emitted from the LED modules to pass through both sides of the substrate, enhancing overall brightness and reducing internal reflection losses.

Another design variation incorporates multiple layers of phosphor coatings to fine-tune the optical parameters of the emitted light. Instead of a single phosphor layer applied to blue LED chips, additional layers of red, green, or yellow-green phosphors can be used to achieve a broader spectrum of colors. By carefully selecting phosphor compositions, the emitted light can simulate natural sunlight or match specific color temperatures needed for specialized applications such as horticultural lighting or medical lighting.

A further enhancement involves controlling phosphor deposition patterns on the LED chips. Instead of uniform coatings, selective phosphor application can create localized variations in optical output. For example, phosphor dots, stripes, or grids can be applied to modulate the spatial distribution of emitted light. This method allows for more precise control of the illumination pattern, reducing glare and improving uniformity in applications such as automotive lighting or architectural lighting.

To improve light mixing, the flexible substrate can incorporate micro-optical structures. These structures, such as microlenses, ridges, or scattering dots, can be integrated into the substrate's surface to control light direction and diffusion. By carefully engineering these features, unwanted shadows or color separation effects can be minimized, resulting in a more uniform and aesthetically pleasing light output.

In another variation, the diffusion layer can include wavelength-selective nanoparticles to enhance light quality. Instead of a simple transparent adhesive mixed with diffusion powder, quantum dots or rare-earth nanoparticles can be embedded in the diffusion layer. These materials can absorb certain wavelengths and re-emit them at different wavelengths, effectively fine-tuning the spectrum of emitted light and improving color rendering.

For applications requiring precise beam control, an integrated collimating film can be added to the flexible substrate. This film consists of micro-lens arrays that help shape the emitted light into a more directional pattern. By adjusting the collimating effect, the lighting apparatus can achieve highly focused illumination for spotlights or wider diffusion for ambient lighting.

To further improve efficiency, a reflective backing layer can be incorporated on one side of the flexible substrate. This layer ensures that any downward-emitted light is redirected toward the desired illumination area. Reflective coatings can be optimized to work in conjunction with the phosphor layers to enhance energy efficiency and prevent unwanted light leakage.

Another design alternative is using heat-resistant phosphors for high-power LED applications. Standard phosphors may degrade under intense heat, leading to color shifts over time. By selecting phosphors with high thermal stability, such as garnet-based phosphors, the longevity and reliability of the lighting apparatus can be significantly improved.

A modification to the arrangement of LED modules can involve a staggered three-dimensional placement. Instead of a purely two-dimensional layout on a flexible strip, LEDs can be positioned at different heights along the substrate. This creates a more natural light dispersion pattern, making the emitted light appear more uniform across various viewing angles.

Lastly, the flexible substrate can be designed with embedded optical waveguides. These waveguides help redistribute light within the structure, ensuring more even illumination and reducing bright spots. Waveguides can also serve as secondary light sources, enhancing the efficiency of the overall system by utilizing otherwise wasted light.

Another variation involves a dual-sided phosphor coating technique, where phosphor layers are applied to both the top and bottom surfaces of the flexible substrate. This method enhances light uniformity and increases overall luminous efficiency by allowing light emitted from LEDs to interact with phosphors from multiple angles before exiting the lighting apparatus. This approach is particularly beneficial for applications requiring omnidirectional illumination, such as filament-style LED bulbs that mimic traditional incandescent filaments.

To further refine light control, directional phosphor application can be implemented. Instead of uniformly coating the LED modules, phosphors can be applied in specific zones or gradients. This method enables the creation of lighting solutions with adjustable color gradients or patterned illumination, useful in automotive taillights, decorative lighting, and stage lighting where dynamic effects are needed.

Another improvement focuses on flexible substrates with embedded microreflectors. These microreflectors can be positioned between LED modules to control the propagation of light and minimize light loss. By carefully designing the placement and angles of these reflectors, the overall light extraction efficiency can be improved, reducing the number of LEDs needed to achieve a desired brightness level.

The lighting apparatus can also incorporate an adaptive color-tuning mechanism by using multiple phosphor-coated LED chips controlled by individual circuits. By dynamically adjusting the driving currents supplied to different phosphor-coated LEDs, the system can shift between different color temperatures, making it suitable for applications such as circadian lighting, where warm light is preferred in the evening and cool light is needed during the day.

To enhance energy efficiency, high-reflectivity coatings can be applied to the flexible substrate's surface. These coatings prevent light absorption by the substrate and maximize the usable light output. This feature is particularly valuable in applications where maximizing luminous efficacy is a priority, such as street lighting and industrial high-bay lighting.

A further improvement can be made by embedding thermally conductive elements within the flexible substrate to manage heat dissipation more effectively. Since LED efficiency decreases as temperature rises, integrating thermally conductive layers, such as graphene or aluminum nitride coatings, helps dissipate heat more efficiently. This allows the LEDs to operate at lower temperatures, extending their lifespan and improving performance.

For specialized applications, UV-activated phosphor coatings can be used to produce unique lighting effects. By incorporating LED modules that emit in the near-UV spectrum, phosphors that are specifically tuned to react to UV light can be used to generate a broad spectrum of visible light. This approach is particularly useful in horticultural lighting, where specific wavelengths are required to promote plant growth.

Another potential variation involves utilizing flexible substrates with tunable optical properties. These substrates can include liquid crystal elements or electrochromic layers that adjust their transparency or diffusion properties in response to an external signal. By integrating such a system, the lighting apparatus can dynamically modify its beam shape and diffusion level, making it ideal for smart lighting solutions.

To enhance visual comfort, low-blue-emission phosphors can be used to reduce eye strain. Traditional LED lighting often emits a significant amount of blue light, which can disrupt sleep cycles and cause discomfort over prolonged exposure. By utilizing phosphors that shift the spectrum toward warmer tones while maintaining high efficiency, lighting systems can be optimized for home and office environments.

Lastly, the lighting apparatus can be designed with specialized coatings that enhance color rendering. High color rendering index (CRI) LEDs require precisely tuned phosphors to generate a broad and balanced light spectrum. By integrating multiple layers of phosphor materials optimized for CRI enhancement, the lighting apparatus can produce light that more accurately represents natural colors, making it suitable for applications such as photography, museum lighting, and retail displays.

These additional variations demonstrate how the flexible LED lighting system can be customized for different applications, balancing efficiency, aesthetics, and performance.

Another variation involves a dual-sided phosphor coating technique, where phosphor layers are applied to both the top and bottom surfaces of the flexible substrate. This method enhances light uniformity and increases overall luminous efficiency by allowing light emitted from LEDs to interact with phosphors from multiple angles before exiting the lighting apparatus. This approach is particularly beneficial for applications requiring omnidirectional illumination, such as filament-style LED bulbs that mimic traditional incandescent filaments.

To further refine light control, directional phosphor application can be implemented. Instead of uniformly coating the LED modules, phosphors can be applied in specific zones or gradients. This method enables the creation of lighting solutions with adjustable color gradients or patterned illumination, useful in automotive taillights, decorative lighting, and stage lighting where dynamic effects are needed.

Another improvement focuses on flexible substrates with embedded microreflectors. These microreflectors can be positioned between LED modules to control the propagation of light and minimize light loss. By carefully designing the placement and angles of these reflectors, the overall light extraction efficiency can be improved, reducing the number of LEDs needed to achieve a desired brightness level.

The lighting apparatus can also incorporate an adaptive color-tuning mechanism by using multiple phosphor-coated LED chips controlled by individual circuits. By dynamically adjusting the driving currents supplied to different phosphor-coated LEDs, the system can shift between different color temperatures, making it suitable for applications such as circadian lighting, where warm light is preferred in the evening and cool light is needed during the day.

To enhance energy efficiency, high-reflectivity coatings can be applied to the flexible substrate's surface. These coatings prevent light absorption by the substrate and maximize the usable light output. This feature is particularly valuable in applications where maximizing luminous efficacy is a priority, such as street lighting and industrial high-bay lighting.

A further improvement can be made by embedding thermally conductive elements within the flexible substrate to manage heat dissipation more effectively. Since LED efficiency decreases as temperature rises, integrating thermally conductive layers, such as graphene or aluminum nitride coatings, helps dissipate heat more efficiently. This allows the LEDs to operate at lower temperatures, extending their lifespan and improving performance.

For specialized applications, UV-activated phosphor coatings can be used to produce unique lighting effects. By incorporating LED modules that emit in the near-UV spectrum, phosphors that are specifically tuned to react to UV light can be used to generate a broad spectrum of visible light. This approach is particularly useful in horticultural lighting, where specific wavelengths are required to promote plant growth.

Another potential variation involves utilizing flexible substrates with tunable optical properties. These substrates can include liquid crystal elements or electrochromic layers that adjust their transparency or diffusion properties in response to an external signal. By integrating such a system, the lighting apparatus can dynamically modify its beam shape and diffusion level, making it ideal for smart lighting solutions.

To enhance visual comfort, low-blue-emission phosphors can be used to reduce eye strain. Traditional LED lighting often emits a significant amount of blue light, which can disrupt sleep cycles and cause discomfort over prolonged exposure. By utilizing phosphors that shift the spectrum toward warmer tones while maintaining high efficiency, lighting systems can be optimized for home and office environments.

Lastly, the lighting apparatus can be designed with specialized coatings that enhance color rendering. High color rendering index (CRI) LEDs require precisely tuned phosphors to generate a broad and balanced light spectrum. By integrating multiple layers of phosphor materials optimized for CRI enhancement, the lighting apparatus can produce light that more accurately represents natural colors, making it suitable for applications such as photography, museum lighting, and retail displays.

These additional variations demonstrate how the flexible LED lighting system can be customized for different applications, balancing efficiency, aesthetics, and performance.

The described embodiments feature four types of LED modules arranged on a flexible substrate, where each type emits light with different optical parameters. However, this arrangement is not limited to four types; it can be modified to accommodate different numbers of LED modules depending on application requirements. For instance, an alternative embodiment may use only three types of LED modules, such as red, green, and blue (RGB), to create a simplified full-color mixing system. This configuration can be beneficial for applications where cost and circuit complexity need to be minimized while still achieving a wide range of colors.

In another variation, the lighting apparatus may include five or more types of LED modules, each emitting light with a unique optical characteristic. For example, an additional warm white or cool white LED module can be introduced to improve overall brightness and color tuning flexibility. By adjusting the driving currents of each module, a wide range of color temperatures can be achieved, making the lighting system suitable for tunable white light applications. This approach is useful in settings where precise control over illumination warmth and intensity is required, such as in smart home lighting or office environments.

A further embodiment may reduce the number of LED types to two primary LED modules, such as blue and yellow phosphor-coated LEDs. In this configuration, white light is achieved by combining blue LED emissions with a yellow phosphor-converted spectrum. While this setup does not provide full RGB color mixing, it simplifies the circuit design and reduces manufacturing costs, making it ideal for general-purpose lighting applications, such as household LED bulbs or automotive lighting. The trade-off between color flexibility and system efficiency can be adjusted based on specific use cases.

The spatial arrangement of LED modules on the flexible substrate can also be modified to optimize light distribution.

In some embodiments, LEDs of different types may be interleaved or randomly distributed rather than arranged in distinct bands. This can enhance light blending and eliminate potential color banding effects. Additionally, the density of LED modules can be adjusted depending on the desired light intensity and uniformity. For example, increasing the number of blue LED modules while maintaining a lower density of red and green modules may enhance efficiency in applications requiring high-intensity white light output.

In another embodiment, adaptive configurations may allow dynamic selection of LED types based on external conditions. A lighting system can incorporate interchangeable or programmable LED modules, where additional LED types can be selectively activated or deactivated depending on ambient lighting needs. This provides versatility for applications where different lighting conditions are required throughout the day. Whether using fewer LED types for efficiency or adding more types for enhanced color accuracy, the modular nature of the system allows flexible adaptation to various design constraints.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:
a flexible substrate having an elongated area, wherein the elongated area is divided into a first band, a second band, a third band, and a fourth band along a Y-axis direction;
a plurality of first-type LED modules disposed on the first band, wherein the first-type LED modules are aligned in a row along an X-axis direction, the X-axis direction being parallel to a longitudinal edge of the elongated area;
a plurality of second-type LED modules disposed on the second band;
a plurality of third-type LED modules disposed on the third band;
a plurality of fourth-type LED modules disposed on the fourth band, wherein the first-type LED modules, the second-type LED modules, the third-type LED modules, and the fourth-type LED modules emit light having different optical parameters, wherein the Y-axis direction is perpendicular to the X-axis direction, wherein the first-type LED modules are substantially aligned with the fourth-type LED modules along the Y-axis, wherein the second-type LED modules are aligned with the third-type LED modules along the Y-axis, and wherein the first-type LED modules are offset from the second-type LED modules in the X-axis direction by a predetermined distance; and
a driver configured to convert an external power source to generate four driving currents respectively supplied to the first-type LED modules, the second-type LED modules, the third-type LED modules, and the fourth-type LED modules, wherein the driver is further configured to adjust a relative ratio of the four driving currents to control a mixed optical parameter of the emitted light.

2. The lighting apparatus of claim 1, wherein the first-type LED modules are blue light sources, the second-type LED modules are green light sources, the third-type LED modules are red light sources, and the fourth-type LED modules are yellow-green light sources.

3. The lighting apparatus of claim 2, wherein the red light sources, the green light sources, the blue light sources, and the yellow-green light sources are arranged on the flexible substrate in a horizontally staggered configuration.

4. The lighting apparatus of claim 2, wherein the red light sources, the green light sources, the blue light sources, and the yellow-green light sources are independent from one another.

5. The lighting apparatus of claim 2, wherein the red light sources comprise blue LED chips coated with red phosphor, the green light sources comprise green LED chips, the blue light sources comprise blue LED chips, and the yellow-green light sources comprise blue LED chips coated with yellow-green phosphor.

6. The lighting apparatus of claim 5, wherein the red phosphor and the yellow-green phosphor are applied to the surface of the LED chips by spraying or dispensing.

7. The lighting apparatus of claim 1, further comprising a diffusion layer covering the flexible substrate, wherein the diffusion layer is a transparent adhesive mixed with diffusion powder.

8. The lighting apparatus of claim 1, wherein the flexible substrate is a light-transmissive substrate.

9. The lighting apparatus of claim 1, wherein terminals pins are provided at both ends of the flexible substrate.

10. The lighting apparatus of claim 9, wherein each band has two terminals located on opposite sides of the band.

11. The lighting apparatus of claim 1, wherein the flexible substrate is curled and arranged in a helical shape within a lampshade.

12. The lighting apparatus of claim 1, wherein the first-type LED modules and the fourth-type LED modules are disposed on a first side of the flexible substrate, and the second-type LED modules and the third-type LED modules are disposed on a second side of the flexible substrate, wherein the first side and the second side are opposite sides of the flexible substrate.

13. The lighting apparatus of claim 1, wherein the first-type LED modules are disposed on a first side of the flexible substrate, and a lens is positioned on a second side of the flexible substrate at a location corresponding to each first-type LED module, wherein the first side and the second side are opposite sides of the flexible substrate.

14. The lighting apparatus of claim 1, wherein the first-type LED modules are disposed on a first side of the flexible substrate, and a heat sink module is positioned on a second side of the flexible substrate at a location corresponding to each first-type LED module, wherein the first side and the second side are opposite sides of the flexible substrate.

15. The lighting apparatus of claim 14, wherein the heat sink modules are connected together to guide heat away from the first-type LED modules.

16. The lighting apparatus of claim 15, wherein multiple heat sink modules transmit heat to a heat sink block.

17. The lighting apparatus of claim 14, wherein the heat sink module is transparent.

18. The lighting apparatus of claim 1, wherein the first-type LED modules, the second-type LED modules, the third-type LED modules, and the fourth-type LED modules are respectively connected in series.

19. The lighting apparatus of claim 1, wherein multiple uneven surfaces are formed on the flexible substrate to enhance light mixing.

20. The lighting apparatus of claim 1, further comprising a torsion sensor configured to detect the twisting state of the flexible substrate, wherein the driver adjusts the driving currents based on the detected twisting state.

* * * * *